Nov. 11, 1941.　　　A. E. FOX　　　2,261,984
THERMAL TREATMENT OF MATERIALS
Filed March 12, 1940
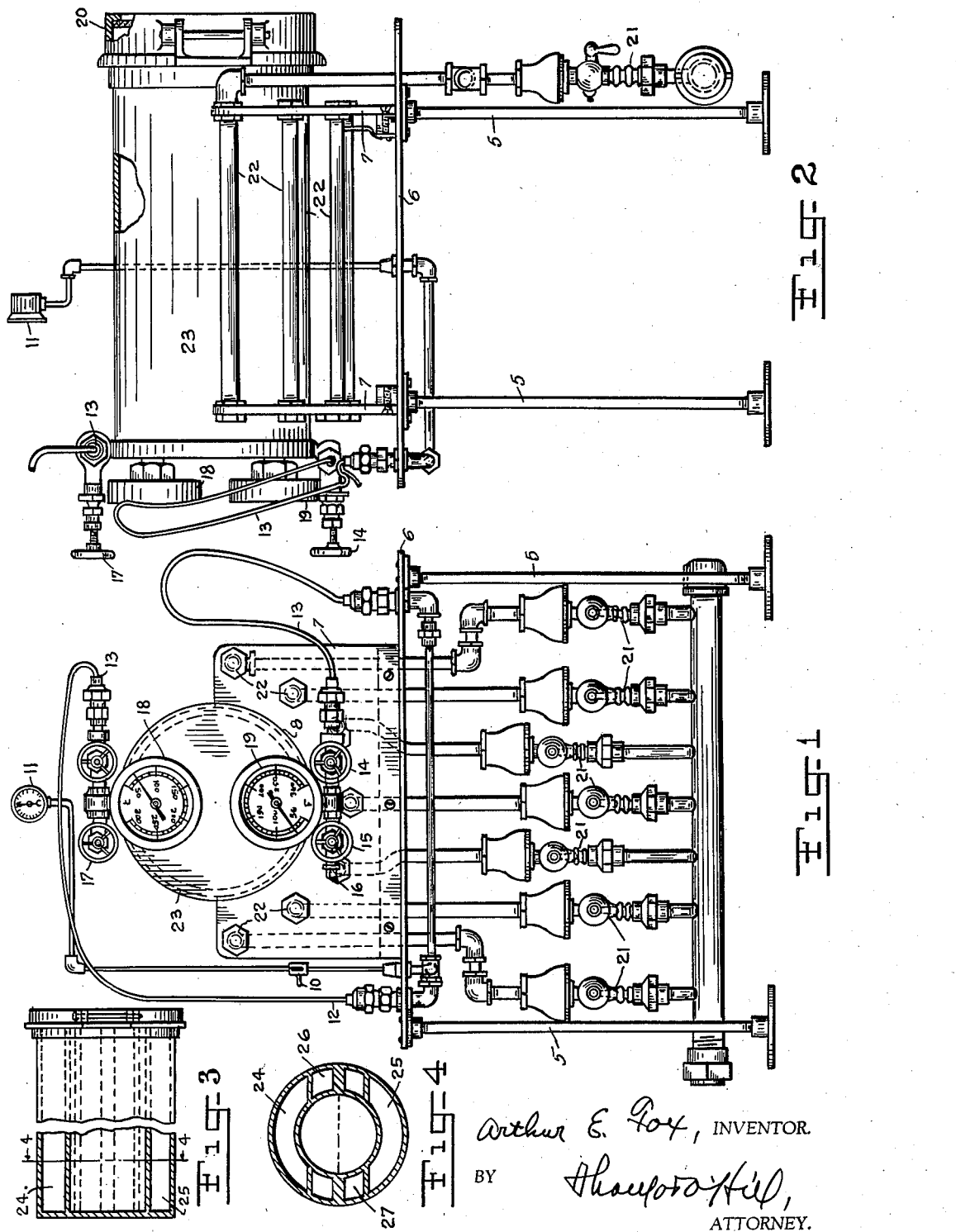
Arthur E. Fox, INVENTOR.
BY Thompson Hill, ATTORNEY.

Patented Nov. 11, 1941

2,261,984

UNITED STATES PATENT OFFICE 2,261,984

THERMAL TREATMENT OF MATERIALS

Arthur E. Fox, New York, N. Y.

Application March 12, 1940, Serial No. 323,588

7 Claims. (Cl. 107—54)

My invention relates to improvements in methods of and apparatus for heating fluids, and is illustrated and described herein more particularly as applied to a sugar cooker of the cylindrical horizontal type, though of course it will be readily understood that various other forms or shapes of cookers may be employed. For instance in candy making various types of cookers are used, such as hemispherical and cylindrical cookers with doors at both ends. Some of these cookers are steam jacketed, from end to end, along the lower half, and a serious objection to these forms of cookers is the fact, that after each batch is cooked, there remains a layer of from plastic to very hard candy on the lower surface. Unless this stiff residue is removed from the heating surface, it undergoes partial decomposition during the following cooking process. In the course of this decomposition, invert sugar and caramel as well as acetic products will be produced, all of which will further the production of more invert sugar in the batch itself. Thus undesirable color is formed as well as excessive invert sugar, which in turn shortens the "shelf life" of the candy to be produced.

In accordance with my invention, the sugar is first cooked in the lower half of the cooker irrespective of its shape or heating means, and after the first batch has been cooked and discharged, the cooker is rotated about 180 degrees allowing the next batch to rest upon the clean bottom which was the top during the preceding cooking operation.

The hot vapors rising from the second cooking operation now contact the residue adhering to the inside top of the cooker, thereby dissolving the same without burning, as there is no external heat applied thereto, and this residue now runs down into the second batch where it mixes without darkening it or spoiling the flavor thereof, thus automatically cleaning the cooker after each batch, without the losses in material, time and labor heretofore resulting from stoppage and the separate cleaning operations.

Also when a steam jacket is used beneath the lower half of a cooker, the sugar content usually extends above the top of the jacket, and as the water from the sugar solution evaporates, the level of the latter is lowered in the cooker, allowing the material to splash on to the exposed heating surface where excessive heat causes a further breaking down of sugar to invert sugar, caramel, etc., whereas in a preferred form of my invention the jackets may be subdivided as follows:

In the embodiment shown in Figs. 3 and 4, upper and lower steam heating jackets 24 and 25 are shown, separated by independently heated intervening jackets 26 and 27. In the course of processing a batch, for example with jackets 25 and 27 in use, the boiling operation continues with both jackets functioning, until the level of the candy recedes almost to the top of jacket 25, whereupon jacket 27 is turned off and the batch is completed with jacket 25 in use. In the same way after completion of this batch, the following batch is cooked with jackets 24 and 26 in the lower position and in use as described above.

Referring to the accompanying drawing, Fig. 1 illustrates in front elevation a suitable form of cooker embodying an application of my invention. Fig. 2 is a side elevation thereof looking from right to left thereat. Fig. 3 is a longitudinal view partly in section showing a steam jacketed form of cooker, and Fig. 4 is a cross section on the line 4—4 thereof.

The apparatus generally comprises a frame structure 5, including a table 6, upon which are positioned two end plates 7 having semi-circular cutout portions 8 to receive the rotatable chamber 23.

In operation, a suction pump is connected at the outlet 10, drawing air from the vacuum gage 11, line 12, and valve connection 13, which is open, valve 17 being closed while valve 14 is closed, and valve 15 is open, the inlet 16 being connected with the fluid sugar supply until the cylinder is about half full, as can be observed through the glass door 20 hinged at the back. Valve 15 is then closed and valve 14 remains closed, valve 17 being opened allowing the vapor to escape, and valve 13 is closed. Heat is then applied by opening the valves 21 of the perforated gas burners 22, and the sugar charge is heated to about 280 degrees F. as indicated upon the thermometer 19, and as the proper time the heat is turned off. Valve 17 is closed, valve 13 is opened, and a vacuum of approximately 27″ or more is established in the cooker for a predetermined length of time. The cooked batch is then discharged, the cylinder 23 is revolved about 180 degrees, and a new batch is charged into the cylinder, operations being resumed as before.

Of course it will be understood that various modifications may be made in the construction and arrangement of parts and in the several steps involved without departing from the spirit of the invention as claimed.

I claim:

1. In the method of producing candy from a sugar solution, the steps which comprise heating a body of said solution only partly filling a container until evaporation has converted such sugar solution into candy of a viscosity such that, as it flows from the container, on discharging into the atmosphere the slight drop in temperature causes a portion to solidify and adhere to the container; introducing new solution into the container to cover a portion thereof not theretofore occupied by the solution and not at such stage occupied by the solid portion of the candy, and heating the newly introduced solution until the vapors therefrom melt the solidified material, causing intermingling thereof with the solution being treated, and continuing the evaporation by heating until conversion of all of the solution into candy.

2. In the evaporation of a liquid in a stationary container, the steps which comprise applying heat to the liquid until it is converted into a plastic or semi-solid state part of which adheres to the interior of the container, withdrawing such portion of the material as will flow readily from the container, introducing a new batch of liquid into the container, rotating the container until the plastic or semi-solid material sticking to the interior surface thereof is no longer immersed in the liquid, and applying heat to the new liquid to evaporate substantially all of the water contained therein and to cause the vapors rising therefrom to melt and dislodge the plastic or semi-solid substance and have it fuse with the liquid.

3. The method of making candy, which comprises feeding a sugar solution into a portion of a reaction drum, heating said sugar solution by applying heat only to said drum portion until the sugar solution is converted into candy of tacky consistency, discharging the portion of the batch which flows readily, rotating the drum approximately 180°, whereby the upper portion thereof occupies the position formerly occupied by the lower portion thereof, feeding a second batch of sugar solution into the bottom part of said reaction drum, and applying heat to the said second batch, to effect evaporation of the water content thereof, the rising vapors being effective to melt the portions of the first batch adhering to the interior upper surface of the drum and to cause the candy solution of such first batch, thus melted, join the body of the solution of the second batch.

4. The method of treating a liquid, in the preparation of candy therefrom, which comprises evaporating the water from the liquid, in a stationary chamber only partially filled with such liquid until conversion of the liquid to a candy has taken place, removing the portion of the candy which does not adhere to the interior surface of the chamber, and leaving a layer of nearly solidified candy on such surface, rotating the chamber approximately 180°, until the interior surface of the chamber, to which such layer adheres, is over a candy-free interior surface of the chamber, charging the chamber with a new batch of liquid and applying heat to evaporate the water therefrom, whereby the hot vapors from such second batch are effective to soften and dislodge said nearly solidified candy and permit its intermingling with the liquid in the bottom portion of the chamber, continuing the evaporation of such composite batch until it has been converted into candy, removing the free and unadhering portion of such candy from the chamber, and repeating the process cyclically as above set forth.

5. Apparatus for treating a liquid in the preparation of a candy therefrom, which comprises a chamber rotatable through an arc of approximately 180° and having the bottom portion thereof surrounded by a heating jacket, means for applying heat through said jacket to a body of liquid within the bottom portion of such chamber.

6. An apparatus for making candy from a solution, which comprises a rotatable chamber, means for charging the lower portion of said chamber with the solution, means for heating the liquid in said lower portion of said chamber, means for discharging the liquid portion of the heated material, said heating means being effective upon the new charge exposed upon rotation of the chamber, to evaporate its moisture during which process the emerging vapors cause the adhering residue of the previous charge to melt and flow into the liquid of the second charge then being heated.

7. An apparatus for the heat treatment of a liquid, comprising a sugar solution, to produce candy therefrom, which comprises a rotatable, substantially cylindrical chamber, a heating jacket surrounding the lower portion of said chamber, a heating jacket surrounding the upper portion of said chamber, and separate heating jackets, two on each side of the chamber, and extending parallel to the axis thereof, the position of said heating jackets, upon rotation of the chamber approximately 180°, being in reverse order.

ARTHUR E. FOX.